United States Patent [19]

Swoager

[11] 4,060,035
[45] Nov. 29, 1977

[54] CONVERTIBLE RAIL-HIGHWAY SHUTTLE CAR

[75] Inventor: Jon R. Swoager, Imperial, Pa.

[73] Assignee: Automation Equipment, Inc., Imperial, Pa.

[21] Appl. No.: 590,412

[22] Filed: June 26, 1975

[51] Int. Cl.² .................... B61C 11/00; B61C 13/00; B61F 13/00; B62D 61/12
[52] U.S. Cl. .................... 105/177; 105/215 C; 105/364
[58] Field of Search ........... 105/26 R, 75, 177, 215 C, 105/364

[56] References Cited

U.S. PATENT DOCUMENTS

| 1,423,947 | 7/1922 | Kramer et al. | 105/177 |
| 2,718,197 | 9/1955 | Bock et al. | 105/215 C |
| 3,228,350 | 1/1966 | Cox | 105/215 C |
| 3,353,504 | 11/1967 | Kersey et al. | 105/364 X |
| 3,540,381 | 11/1970 | White, Jr. | 105/26 R X |
| 3,701,323 | 10/1972 | Cox | 105/215 C |
| 3,793,966 | 2/1974 | Swoager | 105/364 X |
| 3,892,187 | 7/1975 | White, Jr. | 105/75 |

Primary Examiner—Robert J. Spar
Assistant Examiner—Howard Beltran
Attorney, Agent, or Firm—Robert D. Yeager; Howard G. Massung

[57] ABSTRACT

An elongated shuttle car is provided having a set of undriven rail wheels and a set of driven road wheels. The rail wheels are movable between a lowered position wherein they support the shuttle car and a raised position wherein the shuttle car is supported from the road drive wheels. The road drive wheels are independently driven by fluid drive motors, one of which is associated with each road wheel. The road wheels are disposed so as to permit movement of the shuttle car generally perpendicular to its longitudinal axis which is aligned with the rail bed. Hydraulic cylinders or jacks are utilized for raising and lowering the undriven rail wheels which are normally formed of steel. The rail wheels are supported in movable truck assemblies. The movable truck assemblies have an axle permanently attached thereto and a pair of rail wheels are attached to the ends of the fixed axle.

18 Claims, 23 Drawing Figures

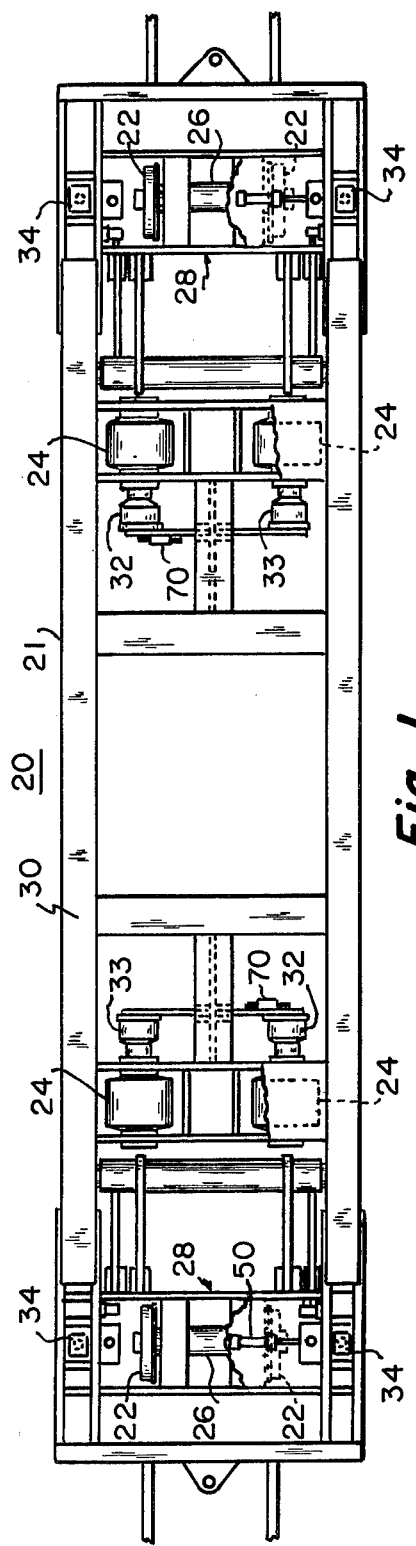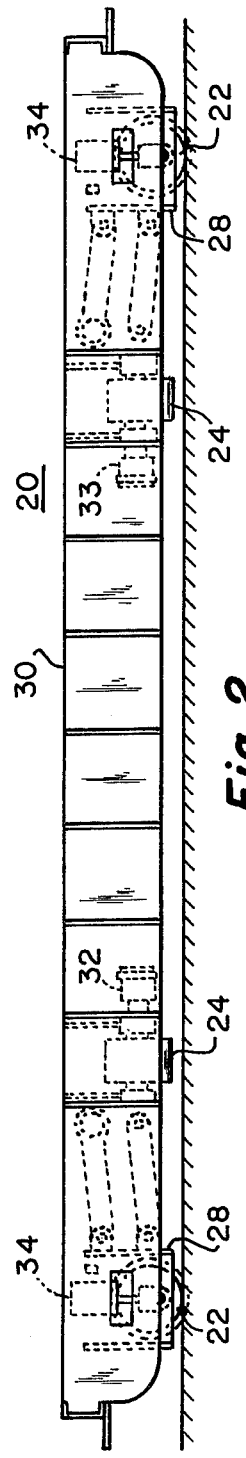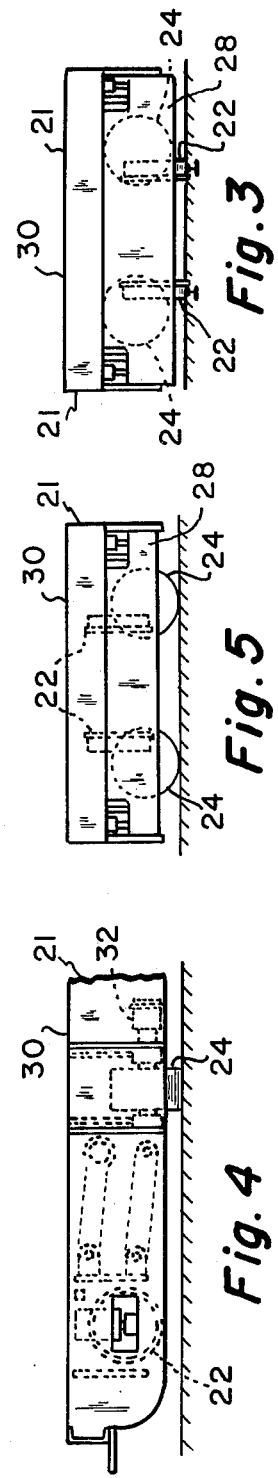

CONVERTIBLE RAIL-HIGHWAY SHUTTLE CAR

BACKGROUND OF THE INVENTION

1. Field of Invention

This invention relates to rail wheel vehicles and more particularly to a rail wheel vehicle having the capability of movement along a road bed.

2. Description of the Prior Art

Applicant is unaware of any prior art shuttle cars which are constructed to carry heavy loads and are capable of operation on and off of rails. In prior art applications the shuttle cars are normally towed to the vicinity of where the steel plates will be used. The load is then transferred from the shuttle car to the shear or other fabricating device by cranes or other unloading devices.

SUMMARY OF THE INVENTION

A load-carrying vehicle is provided having a plurality of rotatable rail wheels which permits movement of the vehicle on a rail bed and a plurality of road wheels disposed to permit the vehicle to be moved along a road bed transverse to and away from the rail bed. The road wheels are driven and the rail wheels are not driven. The vehicle can be operated in a first mode wherein the vehicle is supported by the rail wheels or in a second mode wherein the vehicle is supported by the road wheels. When the vehicle is supported by the rail wheels it can be towed along a rail bed by a locomotive. When the vehicle is supported by the road wheels, the road wheels can be driven by a drive motor to move the vehicle.

The disclosed shuttle car can be moved along a road bed or a rail bed and comprises an elongated main frame, a pair of movable truck assemblies spaced apart and supported from the main frame, with each truck assembly having an axle and a pair of wheels connected thereto, a plurality of road wheels are spaced apart and supported from the main frame, drive means are connected to a plurality of road wheels for driving the road wheels when activated, and a positioning means is provided for moving the truck assemblies between a first position wherein the undriven rail wheels are lower than the road wheels and a second position wherein the road wheels are lower than the undriven rail wheels. The vehicle comprises a frame which supports a flat load surface. Drive means are supported from the frame below the flat load surface. When the truck assemblies are lowered, the rail wheels support the vehicle and when the truck assemblies are in a raised position the vehicle is supported from the road wheels. The road wheels can be driven to move the vehicle transverse to the rail bed. Hydraulic jacks or cylinders can be provided for raising and lowering the truck assembly. These hydraulic cylinders can be trunion mounted to the main frame of the car. A pair of interconnected pivotal links are attached at one end to the truck assembly and at the other end to a torque equalizing tube which connects to the main frame. This torque tube is utilized to assure uniform movement of the truck assembly and equal loading on the hydraulic lift cylinders. Other spaced apart links which are pivotally connected at one end to the main frame and at the other end to the truck assembly can be provided to assure that the truck assemby is maintained vertically upright when it is raised or lowered. A locking means, which can be a hydraulically actuated lock assembly, is provided for locking the truck assembly in a lowered position. This can be used to assure that the truck assembly will be maintained with the rail wheels lowered even when power is disconnected from the shuttle car. The drive means can be a plurality of hydraulic motors each of which is associated with one of the driven road wheels. This provides for individual driving of each road wheel. The disclosed shuttle car is capable of moving very heavy loads along a rail bed and then moving the loads off of the rail bed to fabricating equipment such as a shear. The disclosed shuttle car can handle a payload of 80,000 lbs.

It is an object of the present invention to disclose a shuttle car, for transporting heavy loads, which is operable on a rail bed and a road bed.

It is an object of the present invention to teach a shuttle car which can be towed on rail wheels to a desired location and can then move on its own driven road wheels to a desired position.

It is a further object of this invention to teach a shuttle car having a set of steel rail wheels which can be raised and lowered and a set of drive road wheels which can support and move the shuttle car when the rail wheels are raised.

BRIEF DESCRIPTIONS OF THE DRAWINGS

For a better understanding of the invention, reference may be had to the preferred embodiment exemplary of the invention shown in the accompanying drawings in which:

FIG. 1 is a top view of a shuttle car utilizing the teaching of the present invention;

FIG. 2 is a side view of the shuttle car shown in FIG. 1 with the rail wheels in the extended position supporting the shuttle car;

FIG. 3 is an end view of a portion of the shuttle car shown in FIG. 2;

FIG. 4 is a side view of a portion of the shuttle car shown in FIG. 2 with the rail wheels raised and the road wheels supporting the shuttle car;

FIG. 5 is an end view of the shuttle car as shown in FIG. 4;

DESCRIPTION OF THE PREFERRED EMBODIMENT

Figure 6:
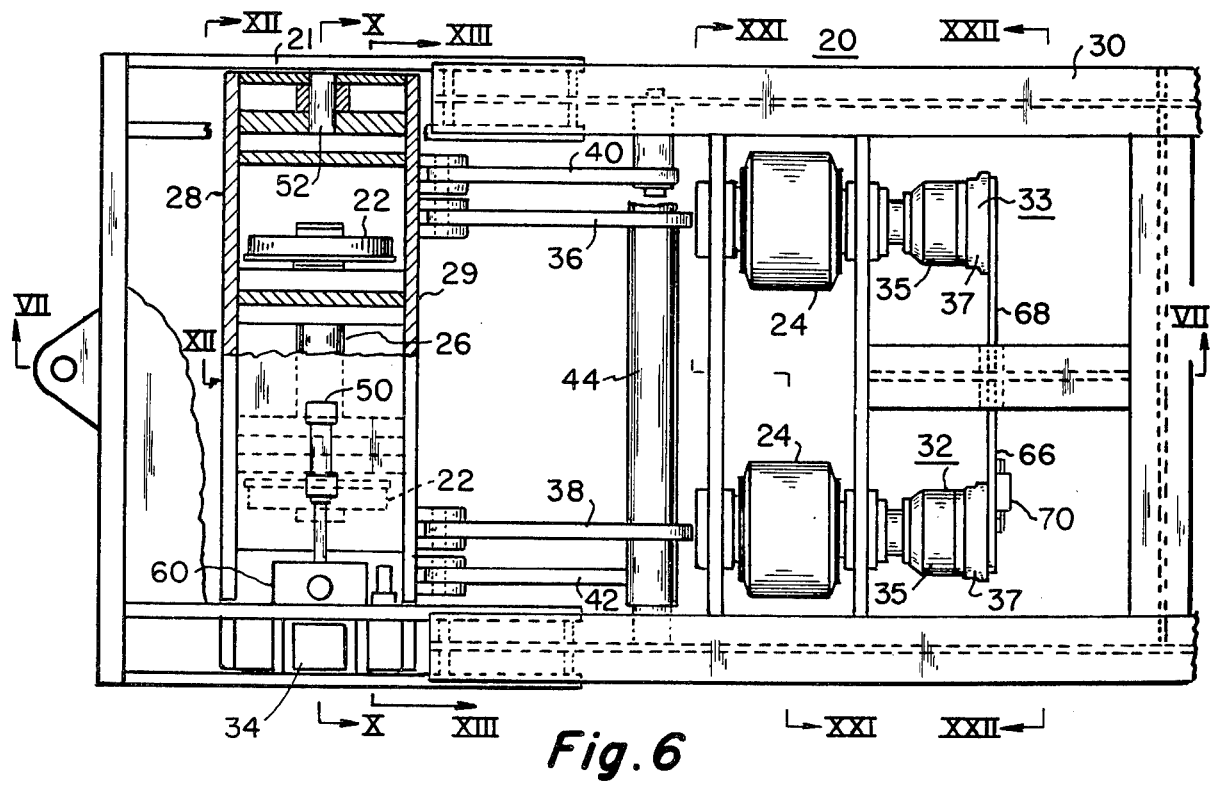
FIG. 6 is a top view of the shuttle car shown in FIG. 1 with portions removed for clarity.
Figure 7:
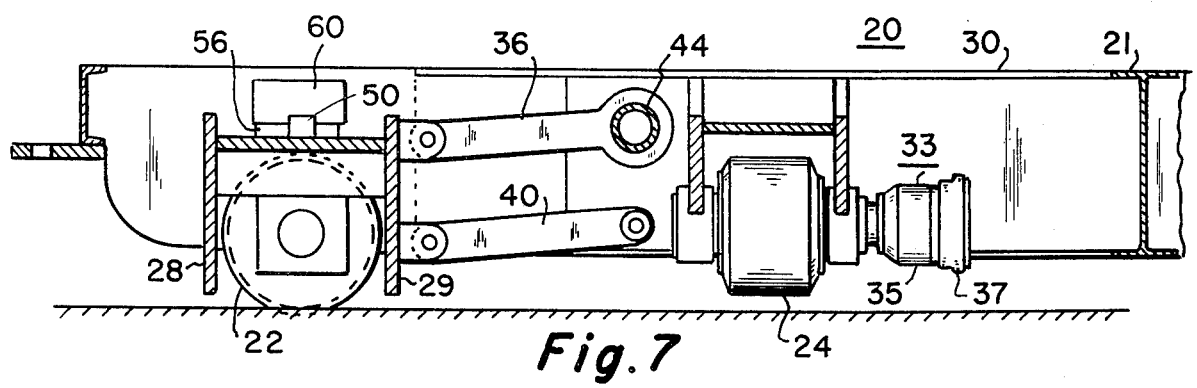
FIG. 7 is a side section view of a portion of the shuttle car shown in FIG. 6 along the line VII—VII with the rail wheels lowered.
Figure 8:
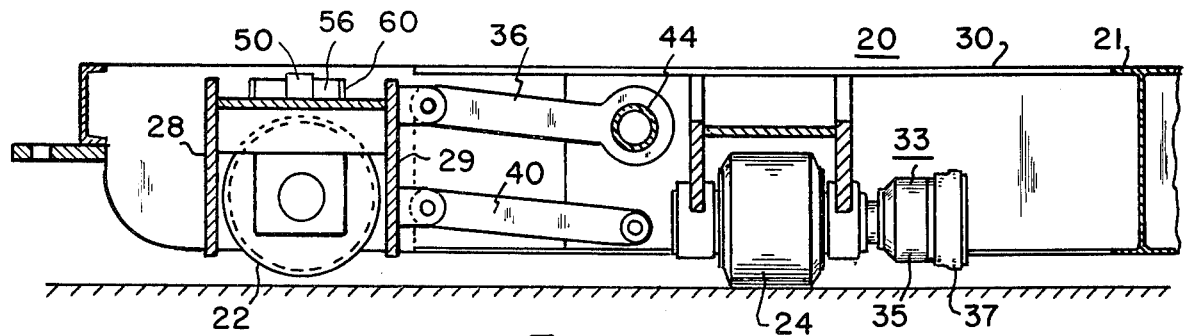
FIG. 8 is similar to FIG. 7 but with the rail wheels raised.
Figure 9:
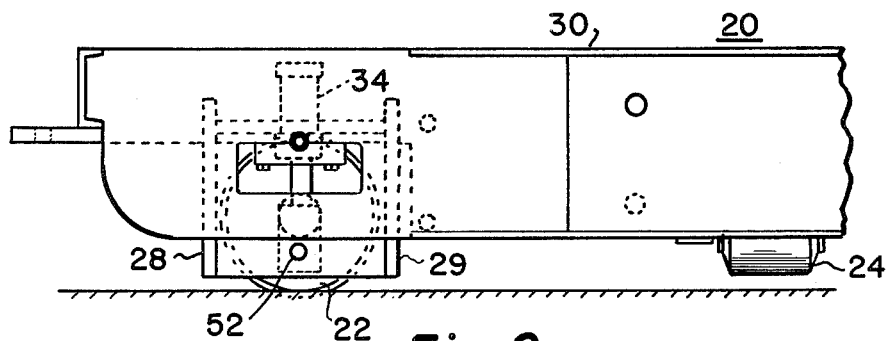
FIG. 9 is a side view of a portion of the shuttle car shown in FIG. 6.

Referring now to the drawings and FIGS. 1 through 5 in paticular, there is shown a shuttle car 20 utilizing the teaching of the present invention. The flanged rail wheels 22 permit shuttle car 20 to be moved along a rail bed. Flanged rail wheels 22 which are undriven are attached to the ends of axle 26. Axle 26 is supported by a movable truck assembly 28. Movable truck assembly 28 is movable between a lowered position as shown in FIG. 2, and a raised position, as shown in FIG. 4. With the truck assembly 28 in the lowered position, the rail wheels 22 engage the rails in the rail bed and support the shuttle car 20. With the truck assembly 28 in the raised position the shuttle car 20 is supported from road wheels 24. Road wheels 24 are mounted to shuttle car 20 for rotational movement around a fixed axis and permit shuttle car 20 to move transverse to the rail bed. Road wheels 24 are driven by hydraulic motors 32 and 33 one of which is attached to each road wheel. A frame 21 formed of connected structural members supports the road wheels 24 and provides a flat upper surface 30 which is utilized for carrying heavy loads.

Figure 17:
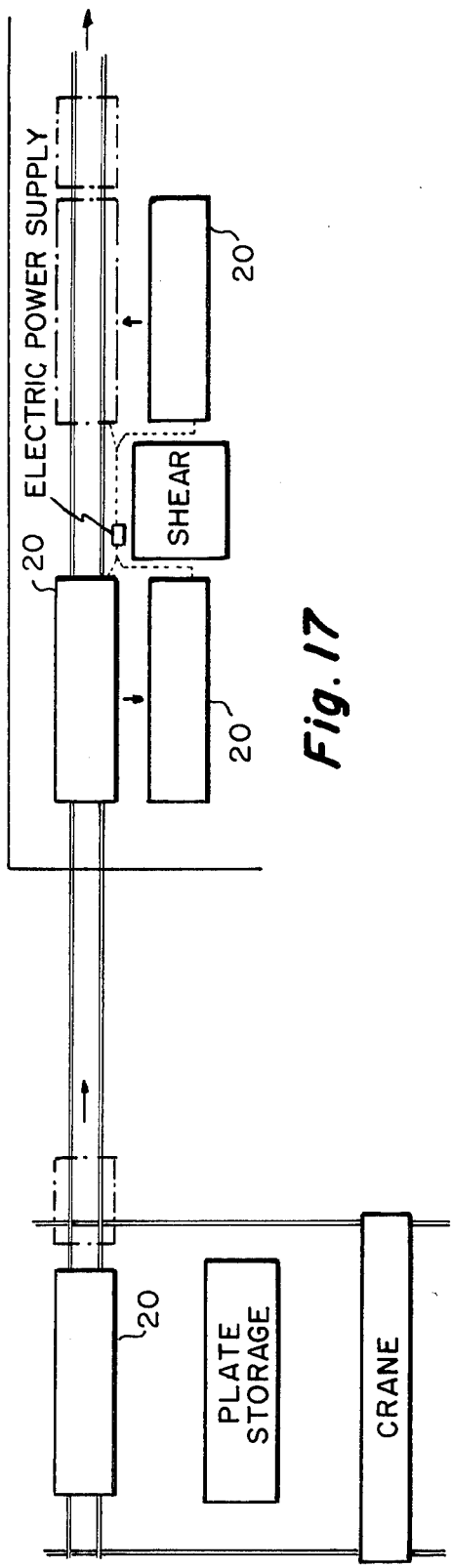
FIG. 17 is a schematic view of an operation for the disclosed shuttle car.
Figure 20:
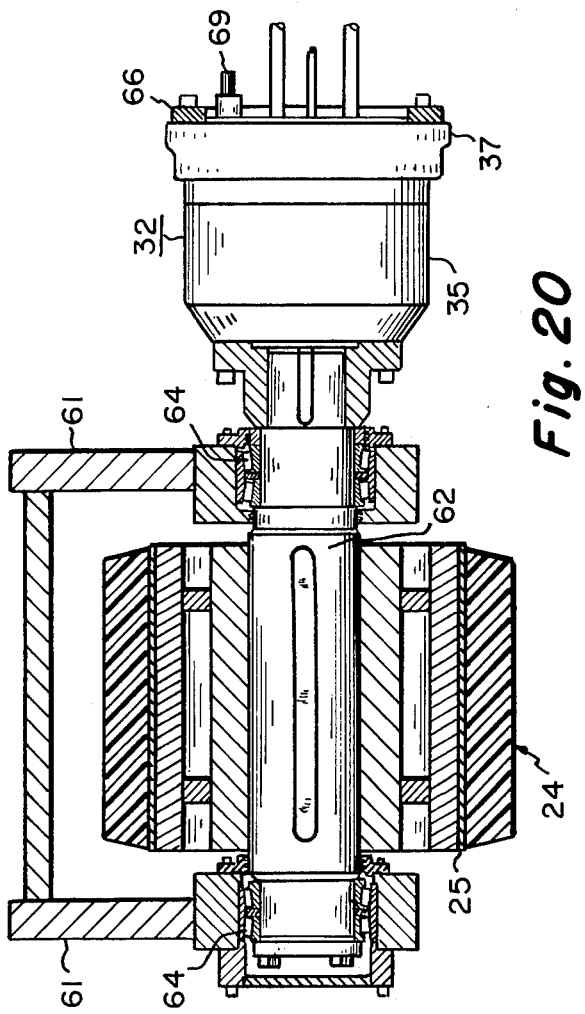
FIG. 20 is a view, partially, in section of the drive road wheels.

A typical load for the disclosed shuttle car would be 80,000 lbs. of steel, such as steel plates 41 ft. long by 10 ft. wide. Typical operation for the shuttle car would be as is shown in FIG. 17. The shuttle car 20 receives steel plates from the steel yard where it is loaded with a crane. Shuttle car 20 is then towed in, with steel wheel truck assembly 28 lowered, on rails into a desired position. At this time the steel wheel truck assembly 28 is lifted lowering the car onto road wheels 24 which are formed from polyurethane. Polyurethane tires 24 are driven by fluid motors 32 and 33 controlled from a remote control actuator and they move the shuttle car 20 sideways in proximity to a shear. The pumps which supply the pressurized fluid to the fluid motors can be driven by any convenient power source. Preferably the pumps are electrically driven and the electric connections are made to the shuttle car when the car is towed into position. Until the hydraulic power is applied the steel wheels cannot be lifted. An operator starts the hydraulic power unit, lifts the steel wheels 22, lowering the shuttle car onto the polyurethane tires 24. At this time, a tram button can be depressed which drives the shuttle car and steel plate load to a shear which is a short distance, such as 12 ft., away. This sideways movement is accomplished at the rate of 50 ft. per minute. After the car is moved adjacent to the shear the hydraulic power is removed and the steel plate load is loaded into the shear by any conventional lifting circuit. Another shuttle car can be utilized at the outbound part of the shear which takes and handles the processed plate. As soon as the car handling the processed plate is filled, the hydraulic power unit is started again bringing the car back onto the rails where it can be automatically located on the rails by limit switches (not shown). When the vehicle is located on the rails the operator can lower the steel wheels which raise the car 20 off of the polyurethane tires 24 and the shuttle car 20 is now ready to tow the processed plates to their next operation.

Figure 10:
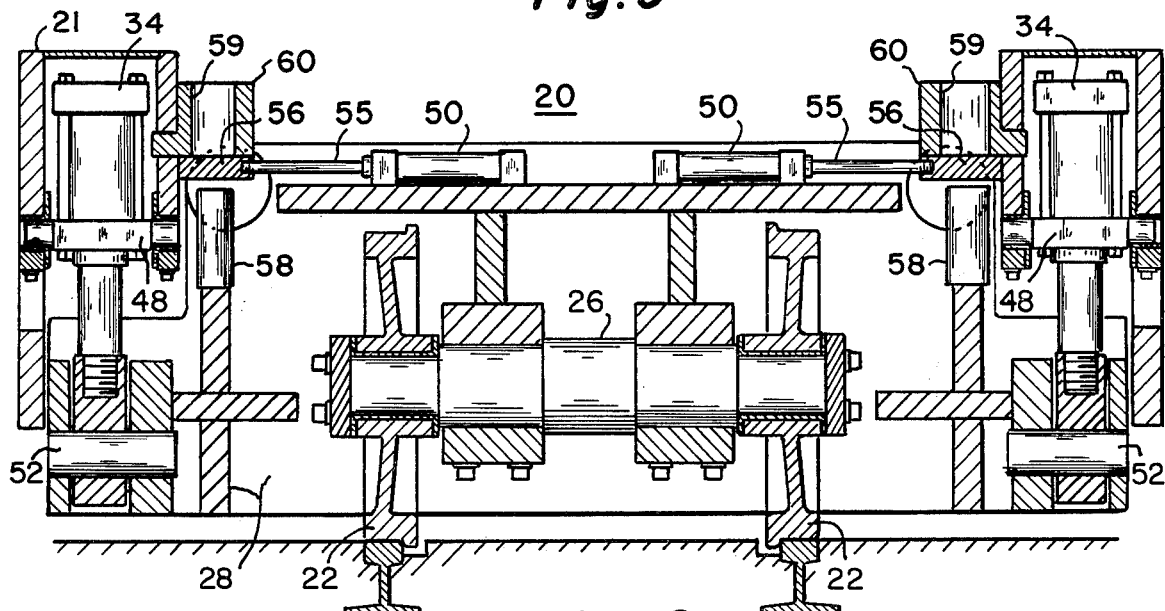
FIG. 10 is a section view of the portion shown in FIG. 6 along X—X.
Figure 11:
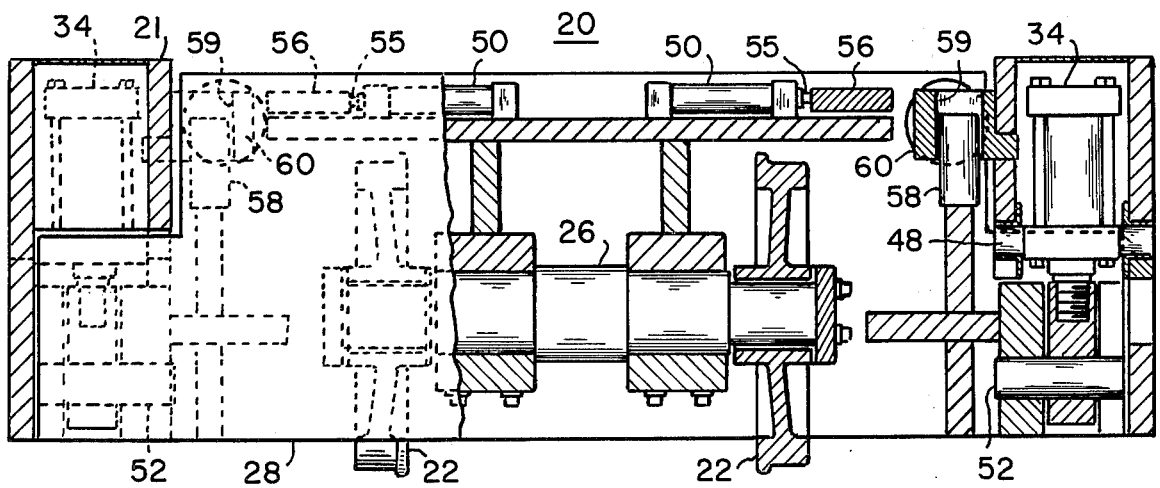
FIG. 11 is similar to FIG. 10 but illustrating the rail wheels in their raised position.
Figure 12:
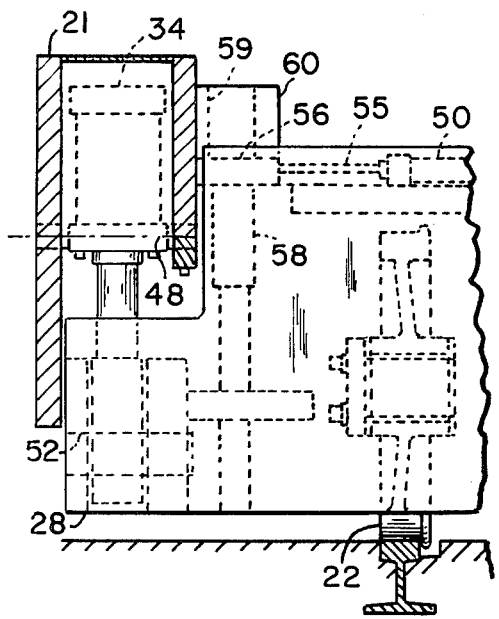
FIG. 12 is a view of a portion shown in FIG. 6 along the line XII—XII.

The steel wheels are connected to movable truck assembly 28 through a fixed axle 26. Steel wheels 22 are 24 inches in diameter. Truck assembly 28 can be raised and lowered by hydraulic lifting cylinders 34. Hydraulic lifting cylinders 34 are operable between a retracted position, as shown in FIG. 11, wherein the steel wheels are raised and the shuttle car 20 is supported by road wheels 24 and an extended position, as shown in FIG. 10, wherein the truck assembly 28 is lowered and the shuttle car 20 is supported from steel wheels 22. Truck assembly 28 is constructed to form a generally elongated box-shaped assembly. Pivotal links 36, 38, 40, and 42 are connected to a vertical side wall 29 of truck assembly 28. Links 36 to 38 are connected to a rotatable torque tube 44 at one end. Links 36 and 38 are rigidly connected to torque tube 44. Torque tube 44 is rotatable connected to the frame 21 of shuttle car 20. The other ends of equalizer links 36 and 38 are pivotally connected to the vertical side wall 29. Links 40 and 42 which are lower and spaced wider than equalizer links 36 and 38 are pivotally connected to stub shafts projecting from the frame 21. The other ends of links 40 and 42 are pivotally connected to the vertical surface 29 of truck assembly 28. This provides a four bar linkage connection having equal length side bars connecting parallel planes which assures that the vertical surface 29 is moved parallel to the surface defined by the pivot connections of links 36, 38, 40, and 42 to frame 21. The pivotal connection of links 36, 38, 40, and 42 to frame 21 define a vertical plane and thus surface 29 must be maintained vertical even when moved. Thus, although the truck assembly 28 moves through a slight arc when raised or lowered its vertical alignment is always maintained. Rigidly connecting links 36 and 38 to torque tube 44 assures that truck assembly 28 will be uniformly raised. This also provides for equal loading on hydraulic cylinders 34. Hydraulic cylinders 34 are trunion mounted around axis 48 which permits some arcurate movement as the steel wheel truck assembly 28 is raised or lowered. Hydraulic locking cylinders 50 are provided for locking the truck assembly 28 in the down position. This permits the truck assembly 28 to be locked down with all power removed from the shuttle car 20. The single axle 26 which is supported by the truck assembly is a dead non-rotating axle. The steel wheels 28 rotate around high tensile strength bronze bushings. Hydraulic cylinders 34 are connected to movable truck assembly 28 by pins 52. The only connections between the shuttle car frame 21 and the movable truck assembly 28 are through the hydraulic cylinders 34 and links 36, 38, 40, and 42. With links 36, 38, 40, and 42 and hydraulic cylinders 34 disconnected from truck assembly 28 the shuttle car frame 21 could be lifted away from the truck assembly 28.

Referring now to FIGS. 10 and 11, there is shown a more detailed view of a portion of shuttle car 20. As can easily be seen the hydraulic lifting cylinders 34 are trunion mounted about an axis, indicated as 48, which allows them to pivot as the truck assembly 28 is raised. The moving end of hydraulic cylinders 34 are rod-eye mounted to the movable truck assembly 28. Hydraulic locking cylinders 50 are provided for locking the truck assembly 28 in the down position as shown in FIG. 10. The actuating rod 55 from hydraulic cylinder 50 has a locking block 56 connected thereto. As shown in FIG.

11, when truck assembly 28 is raised a positioning pin 58 passes into the bore 59 of an L-shaped part 60 which is rigidly secured to frame 21. When the truck assembly 28 is in the down position, wherein the shuttle car 20 is supported by rail wheels 22, block 56 is moved by hydraulic cylinder 50 to a position as shown in FIG. 10 preventing the truck assembly 28 from being raised. If fluid power is then removed from shuttle car 20 the weight of shuttle car 20 will rest upon truck assembly 28 through locking blocks 56. This permits power to be removed from lifting cylinders 34 while still maintaining the rail wheels in a down position. Truck assembly 28 will thus be locked in the down position permitting rail towing of the shuttle car 20. With the truck assembly 28 raised, the weight of shuttle car 20 is supported on road wheels 24.

Locking cylinder 50 is a relatively small hydraulic cylinder having an inch and a half bore. Its purpose is to lock the wheel assembly 28 down. When the wheel assembly 28 is lowered and hydraulic power is removed, block 56 supports the frame 21 from truck wheel assembly 28. With power off there is no hydraulic pressure left to maintain the load from the hydraulic cylinders 34 so when the car is being towed, on the steel wheels, it must be supported thru block 56. Hydraulic cylinder 50 puts block 56 in position between truck assembly 28 and shuttle car frame 21 so that the weight of the shuttle car 20 and the associated load are transmitted through frame 21 into the steel wheel truck assembly 28. The hydraulic lifting cylinders 34 have six inch bores.

A drive motor 32 or 33 is supplied for each road wheel 24. Motors 32 and 33 are hydraulic motors which permit fine control of drive wheels 24. Drive wheels 24 are formed from polyurethane. The wheels 24 are directly connected to the frame through structural members 61. Wheels 24 comprise a center shaft 62 which is supported on both ends by dual roller bearings 64. Members 61 provide support for the polyurethane tires 24 which are utilized. Drive wheels 24 are driven with radial piston fluid motors which each have a torque capacity of 69 ft./lbs. per 100 psi. Each wheel 24 is independently driven. Shuttle car 20 thus has four wheel drive. Motors 32 which are connected to two of the wheels 24 are provided with brakes. The brakes are conventional integrally mounted band brakes that are supplied with the motors. Motors 32 and 33 are wheel type motors and have the capability of being mounted directly on a wheel. Due to the heavy loads moved by the disclosed shuttle car, the motor 32 or 33 is mounted to drive shaft 62 which extends from wheel 24 and which is supported on both sides of the wheel 24 by the bearings 64. Torque arms 66 and 68 are provided for supporting the non-rotating portion 37 of drive motors 32 and 33. Motors 32 and 33 do not contain a shaft so they are flange mounted to drive shaft 62. Torque arms 66 and 68 support the non-rotating portion 37 of the motor so drive shaft 64 causes the integral tire 24 to rotate. An actuator 70 is cnnected to the brake 69 of drive motor 32 and can brake drive motor 32 whenever desired.

Portion 35 of the fluid motors rotate and portion 37 of the fluid motors 32 or 33 are held stationary by torque bars 66 and 68. The rotating portion 35 of the torque motors 32 or 33 is flange mounted to drive shaft 64. Drive shaft 62 is supported on both ends by double roller Timken bearings. The polyurethane tires 24 are sixteen inches wide, and 22 inches in diameter with a sixteen inch diameter hub. A solid urethane ring 27 is pressed onto the hub 25. The hub 25 is manufactured in four pieces. There is an outer ring which is 16 inches in diameter and an inner ring which is formed around a piece of tubing. A web support is provided between the inner and outer rings. The inner ring is key-locked onto drive shaft 62. A set screw is provided through the key to insure that there is no movement of the key.

Figure 14:
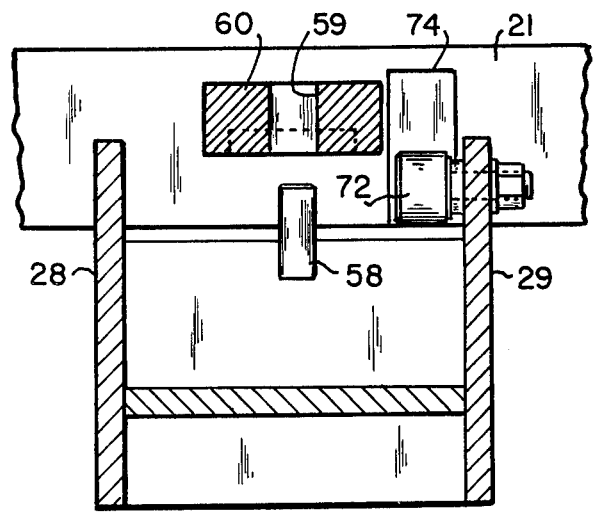
FIG. 14 is a view of a portion of the shuttle car shown in FIG. 13 along the line XIV—XIV.
Figure 13:
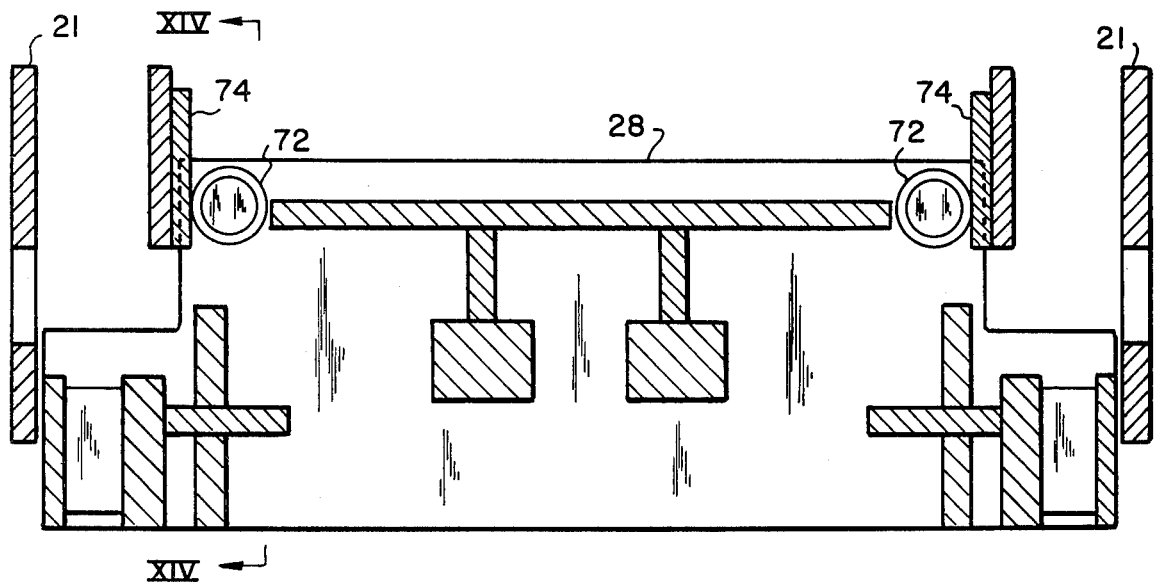
FIG. 13 is a view of a portion of the vehicle shown in FIG. 6 along the line XIII—XIII.
Figure 15:
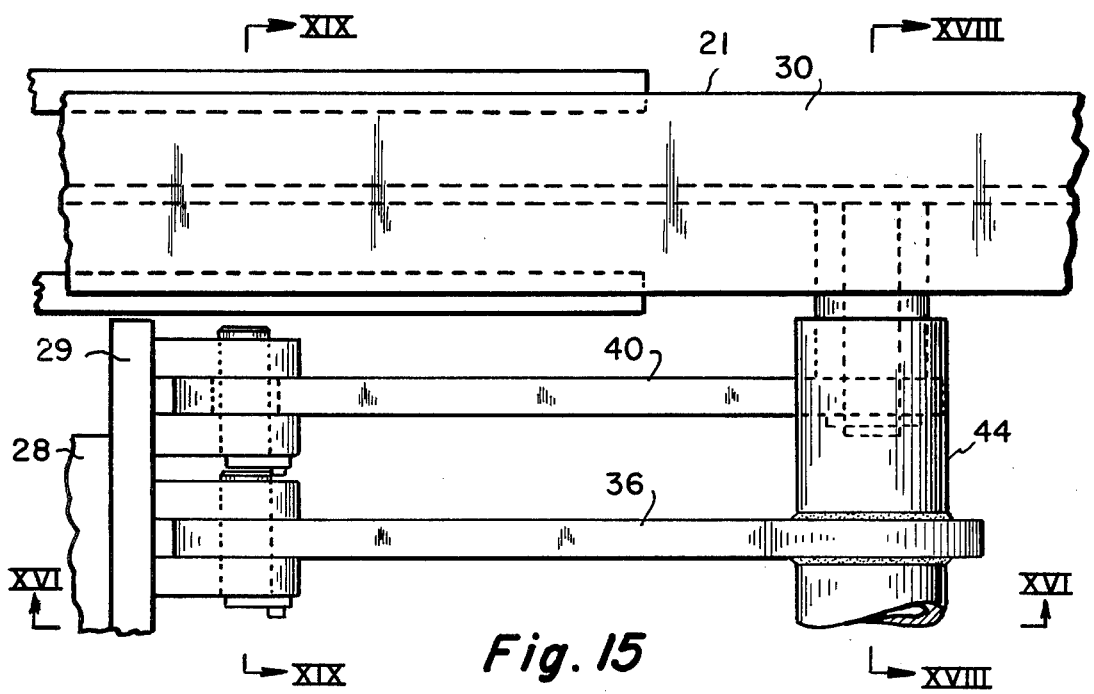
FIG. 15 is a top view of a portion of the shuttle car.
Figure 16:
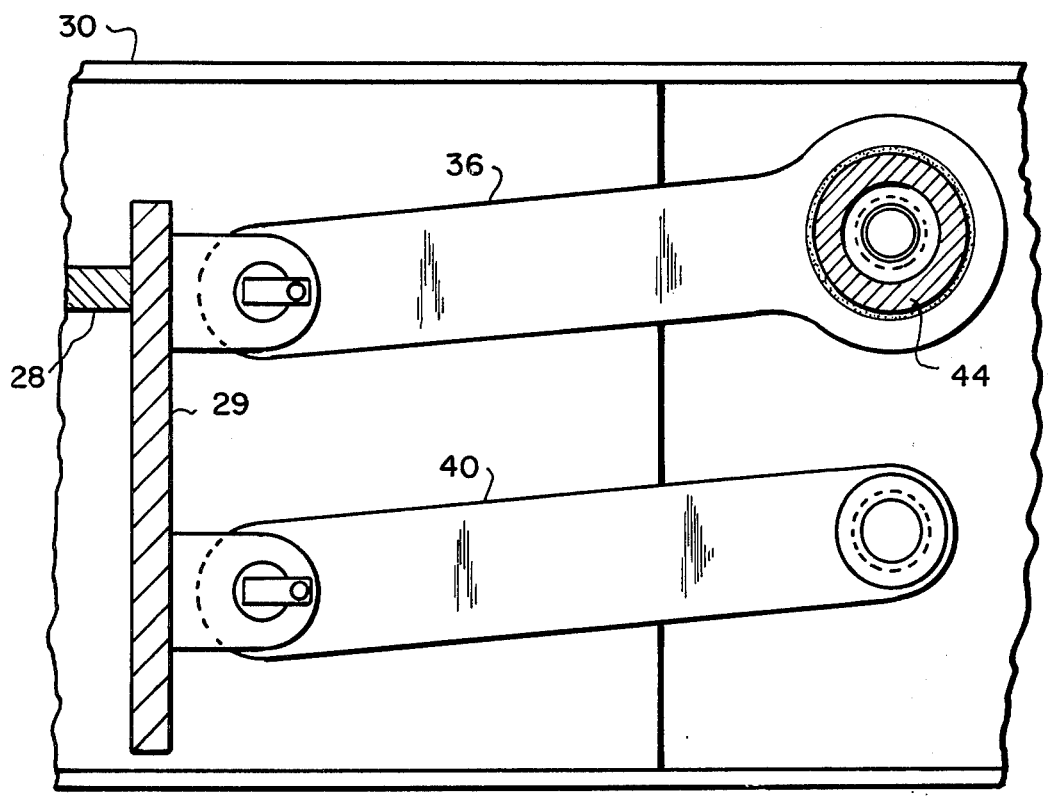
FIG. 16 is a view of the portion shown in FIG. 15 along the lines XVI—XVI.

Referring now to FIGS. 13 and 14, there is shown a more detailed view of a portion of shuttle car 20. Truck 28 as it is raised is guided on cam rollers 72 which move on wear plates 74. These cam rollers 72 guide truck 28 and assure that there is no deflection as it raises and it doesn't flutter as might occur if it slid along frame 21. Cam rollers 72 reduce friction against frame 21 and provide for close tolerance guiding.

Figure 18:
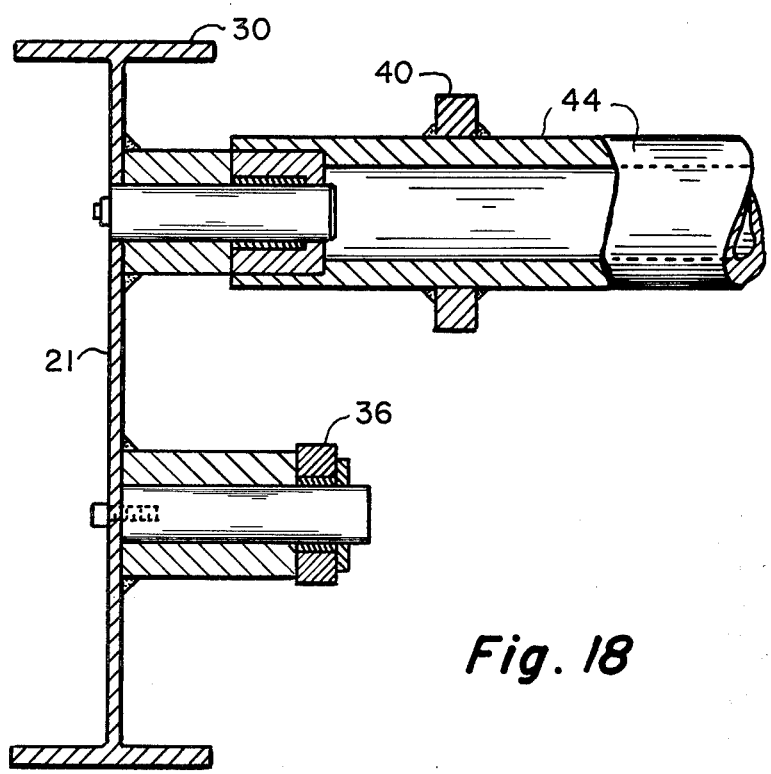
FIG. 18 is a section view of FIG. 15 along XVIII—XVIII.
Figure 19:
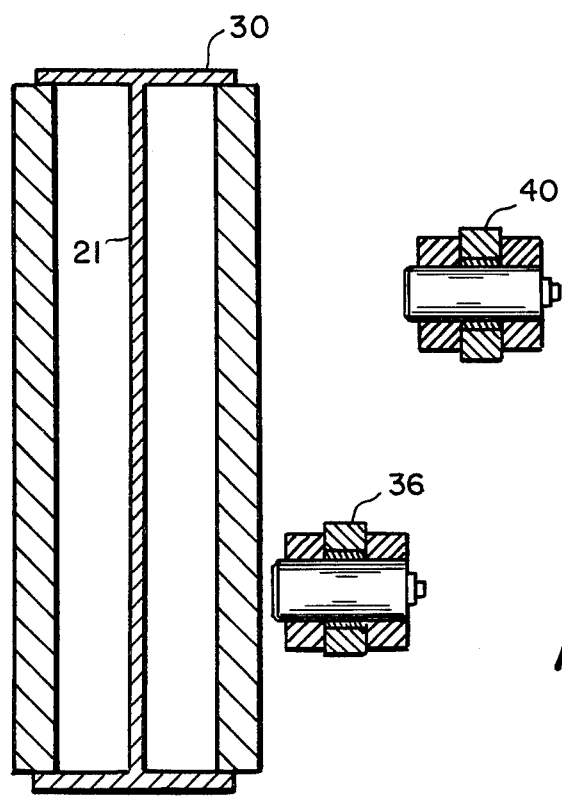
FIG. 19 is a section view in FIG. 15 along XIX—XIX.
Figure 21:
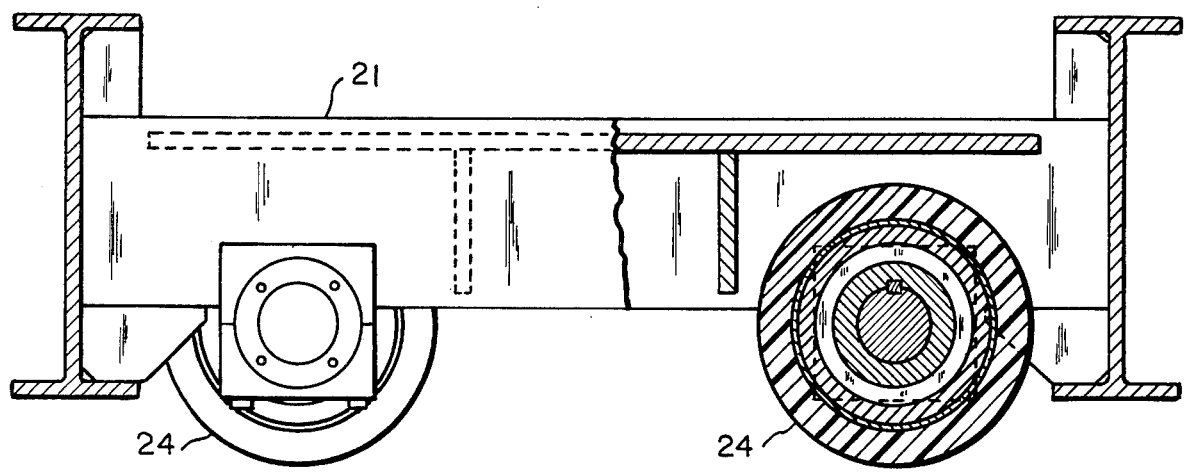
FIG. 21 is a view in FIG. 6 along the line XXI—XXI.
Figure 22:
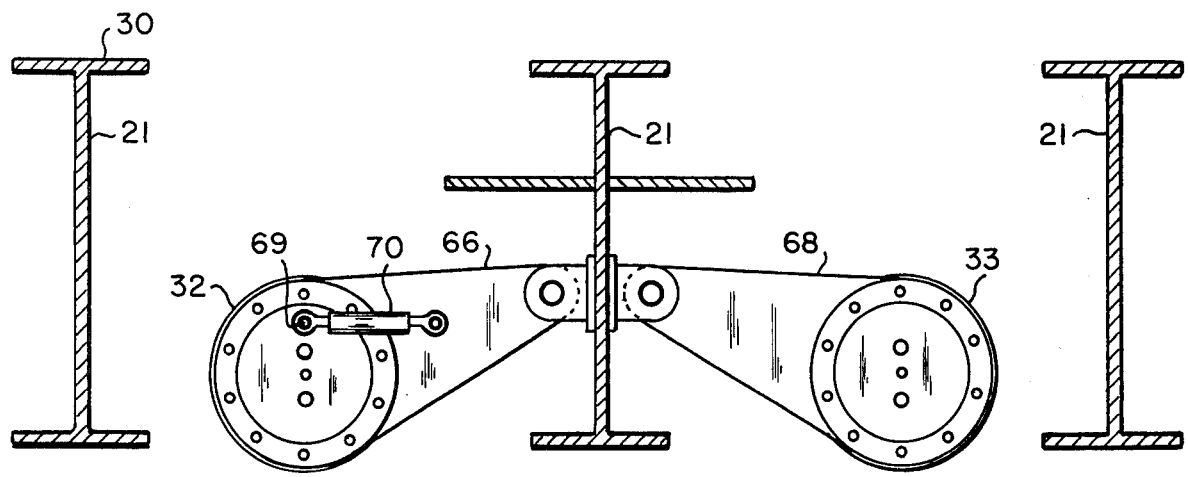
FIG. 22 is a view in FIG. 6 along the line XXII—XXII.
Figure 23:
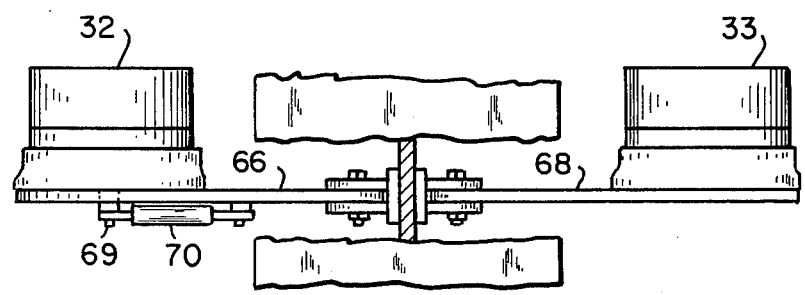
FIG. 23 is a plan view of a portion of the shuttle car shown in FIG. 6.

FIGS. 18 and 19 shows a portion of the box beam assembly which forms part of the main frame 21 support between the pair of truck assemblies 28.

It can thus be seen that the disclosed shuttle car is capable of being moved on either a rail bed or a road bed. Drive motors 32 and 33 permit the shuttle car to be driven away from the rail bed when desired. This facilitates handling of heavy loads and eliminates the need for heavy overhead cranes in many applications.

What is claimed is:

1. A shuttle car, for transporting massive loads, movable on a road bed and a rail bed comprising:
   an elongated main frame;
   a pair of movable truck assemblies spaced apart and movably supported from said elongated main frame;
   a pair of flanged rail wheels supported from each truck assembly for rotation about an axis perpendicular to the longitudinal axis of said elongated main frame;
   a plurality of smooth solid resilient wheels supported from said elongated main frame for rotary movement about axes fixed with respect to said elongated main frame which axes are parallel to the longitudinal axis of said elongated main frame;
   drive means connected to said plurality of smooth solid resilient wheels for driving all of said plurality of smooth solid resilient wheels when activated; and,
   positioning means for moving said pair of truck assemblies between a first position wherein said flanged rail wheels are lower than said plurality of smooth solid resilient wheels, fully supporting said frame, and a second position wherein said plurality of smooth solid resilient wheels are lower than said flanged rail wheels, fully supporting said frame, and a second position wherein said plurality of smooth solid resilient wheels are lower than said flanged rail wheels, fully supporting said frame, for moving the shuttle car in a direction transverse to its longitudinal axis.

2. A shuttle car as claimed in claim 1 wherein:
   said plurality of smooth solid resilient wheels, each comprising a solid polyurethane tire, are mounted to move the shuttle car in a direction transverse to the longitudinal axis of said elongated main frame when said drive means is activated;
   said positioning means utilizes of hydraulic cylinders for moving between the first and second position; and, locking means which is hydraulically operated for mechanically locking said positioning means in the first position.

3. A shuttle car as claimed in claim 2 wherein: said plurality of smooth solid resilient wheels are mounted to move the shuttle car perpendicular to the rail bed when said drive means is activated.

4. A shuttle car as claimed in claim 1 wherein: said pair of movable truck assemblies each comprises a generally elongated box-shaped frame; and,
a plurality of pivoted links connected at one end to a vertical side of said movable truck assembly and pivotally connected at the other end to a vertical portion of said frame to assure that the vertical orientation of the truck assembly is maintained when it is moved.

5. A shuttle car as claimed in claim 1 wherein:
said drive means comprises a plurality of fluid drive motors each being connected to one of said plurality of smooth solid resilient wheels; and,
said positioning means comprises a plurality of fluid cylinders, a pair of wheel are mounted for positioning each movable truck assembly.

6. A shuttle car as claimed in claim 5 comprising:
locking means for locking said positioning means in the first position.

7. A load carrying velicle, for transporting heavy loads, which can move on rails and a smooth surface comprising:
a frame defining a longitudinal axis;
a flat upper surface, utilized for carrying heavy loads, defined by the top of said frame;
a plurality of rotatable flanged rail wheels positionable supported from said frame which when in engagement with rails permit movement in an axial direction relative to said frame;
a plurality of drive wheels supported on fixed axes from said frame for engaging the smooth surface and which when in engagement with the smooth surface permit movement in a direction transverse to the longitudinal axis defined by said frame;
drive means disposed beneath said flat upper surface for driving all of said plurality of drive wheels;
each of said plurality of drive wheels comprises a solid resilient tire; and,
positioning means for providing relative movement between said plurality of rotatable flanged rail wheels and said plurality of drive wheels to a first position wherein said flanged rail wheels are lower than said drive wheels and a second position wherein said flanged rails wheels are higher than said drive wheels.

8. A load carrying vehicle as claimed in claim 7 wherein said positioning means comprises:
a movable truck member;
a plurality of fluid drive cylinders for raising and lowering said movable truck member;
a pair of horizontally spaced apart links pivotally connected at one end of said movable truck member;
a torque equalizing tube supported for movement around its longitudinal axis having said spaced apart links connected thereto for controlling movement of said truck member; and wherein
a pair of said plurality of rotatable flanged rail wheels are mounted from said movable truck.

9. A load carrying vehicle as claimed in claim 8 wherein said drive means comprises:
a plurality of fluid drive motors each associated with one of said plurality of said drive wheels.

10. A load carrying vehicle as claimed in claim 7 wherein:
said plurality of drive wheels are relatively fixed for rotation around a selected axis permitting movement of said vehicle perpendicular to its longitudinal axis.

11. A vehicle comprising:
an elongated frame;
a flat load surface, extending the entire length of said frame, supported from said frame;
drive means supported from said frame beneath said flat load surface;
a set of smooth resilient drive wheels supported by said frame for rotational movement about axes parallel to the longitudinal axis of said frame and fixed with respect to said frame and being connected to and driven by said drive means when said drive means is activated;
a set of flanged wheels supported from and movable, up and down, with respect to said frame; and,
positioning means connected between said frame and said set of undriven wheels beneath said flat load surface for moving said set of flanged wheels between a first position wherein said set of flanged wheels are supporting said frame and said set of smooth resilient drive wheels and a second position wherein said set of smooth resilient drive wheels are supporting said frame and said set of flanged wheels.

12. A vehicle as claimed in claim 11 comprising:
a pair of steel wheel assemblies spaced apart and movably supported from said frame;
an axle supported in each of said steel wheel assemblies;
a pair of said set of flanged wheels formed of steel connected to opposite ends of said axle.

13. A vehicle as claimed in claim 12 wherein said positioning means comprises:
a pair of hydraulic cylinders spaced apart generally along the longitudinal axis of said axle connected to each steel wheel assembly;
said steel assembly comprises a vertical surface; and,
a plurality of links pivotally connected at one end to spaced apart points on said vertical surface and pivotally connected at the other end about points fixed with respect to said frame so that said vertical surface is maintained vertical as the associated steel wheel assembly is moved.

14. A vehicle as claimed in claim 11 wherein said drive means comprises:
a plurality of drive motors each associated with and supplying power to one of smooth resilient said set of drive wheels.

15. A vehicle as claimed in claim 11 wherein said positioning means comprises:
a plurality of hydraulic cylinders for raising and lowering said set of flanged wheels; and,
hydraulic lock means for locking said flanged wheels in the lowered first position.

16. A vehicle as claimed in claim 11 wherein:
said set of flanged wheels are steel rail wheels;
said set of smooth resilient drive wheels are for movement on a smooth surface; and,
said set of flanged rail wheels are longitudinally spaced along said frame and said set of smooth, resilient drive wheels are mounted beneath said frame between the spaced apart pair of rail wheels.

17. A shuttle car operable on rails and a flat surface comprising:
an elongated frame;
a plurality of pairs of flanged rail wheels supported in spaced apart relationship along said elongated frame which fully support the shuttle car when operated on rails;
a plurality of flat surface wheels, each comprising a tire formed from a solid resilient material and having a level circumference, all of which are driven and mounted from said frame, from rotational movement only, transverse to the longitudinal axis of said elongated frame and which fully support the shuttle car when operated on the flat surface;
positioning means for positioning said plurality of pairs of flanged rail wheels with respect to said plurality of flat surface wheels between a first position wherein the frame is supported from said plurality of pairs of flanged rail wheels and a second position wherein said frame is supported from said plurality of flat surface wheels;
a plurality of hydraulic motors one connected to drive each flat surface wheel; and,
hydraulic drive means connected to said plurality of hydraulic motors for supplying hydraulic power thereto.

18. A shuttle car as claimed in claim 17 wherein:
each pair of flanged rail wheels is supported from a movable frame on an axle positioned perpendicular to the longitudinal axis of the elongated frame.

* * * * *

UNITED STATES PATENT AND TRADEMARK OFFICE
CERTIFICATE OF CORRECTION

PATENT NO. : 4,060,035
DATED : November 29, 1977
INVENTOR(S) : Jon R. Swoager

It is certified that error appears in the above-identified patent and that said Letters Patent are hereby corrected as shown below:

Claim 1, starting at line 27, "and a second position wherein said plurality of smooth solid resilient wheels are lower than said flanged rails wheels, fully supporting said frame," should be deleted.

Claim 2, line 7, after "utilizes" --a plurality-- should be added.

Claim 5, line 6, "wheel" should read --which--.

Claim 8, line 7, "of" should read --to--.

Claim 13, line 6, after "steel" --wheel-- should be added.

Signed and Sealed this

Eighteenth Day of April 1978

[SEAL]

Attest:

RUTH C. MASON
Attesting Officer

LUTRELLE F. PARKER
Acting Commissioner of Patents and Trademarks